United States Patent [19]

Snow

[11] 4,299,810
[45] Nov. 10, 1981

[54] PROCESS FOR SEPARATING SELENIUM AND TELURIUM FROM EACH OTHER

[75] Inventor: Gary N. Snow, Salt Lake City, Utah

[73] Assignee: Kennecott Corporation, Stamford, Conn.

[21] Appl. No.: 183,819

[22] Filed: Sep. 3, 1980

[51] Int. Cl.³ .............................................. C01B 19/02
[52] U.S. Cl. ................................... 423/510; 423/41; 423/508; 75/99
[58] Field of Search ................. 423/508, 509, 510, 41; 75/99

[56] References Cited

U.S. PATENT DOCUMENTS

| | | | |
|---|---|---|---|
| 2,039,256 | 4/1936 | Martin et al. ............................ | 75/99 |
| 2,076,738 | 4/1937 | Martin et al. ........................ | 423/510 |
| 2,322,348 | 6/1943 | Clark ................................... | 423/509 |
| 2,349,697 | 5/1944 | Bierly .................................. | 423/510 |
| 3,419,355 | 12/1968 | von Stein ............................ | 423/510 |
| 4,002,544 | 1/1977 | Heimala et al. ..................... | 75/99 X |
| 4,163,046 | 7/1979 | Subramanian et al. ............. | 423/510 |

*Primary Examiner*—Earl C. Thomas
*Attorney, Agent, or Firm*—Mallinckrodt & Mallinckrodt

[57] ABSTRACT

A process for separating selenium and tellurium values from each other by heating a solution containing both to a temperature and for a time period, in the presence of concentrated sulfuric acid under substantially anhydrous conditions, sufficient to precipitate the tellurium values. The process is primarily applied to decopperized copper anode slimes by first leaching such slimes with concentrated sulfuric acid under the specified conditions, separating the liquid and solids phases, and then removing the tellurium from the solids phase by a water leach.

9 Claims, 1 Drawing Figure

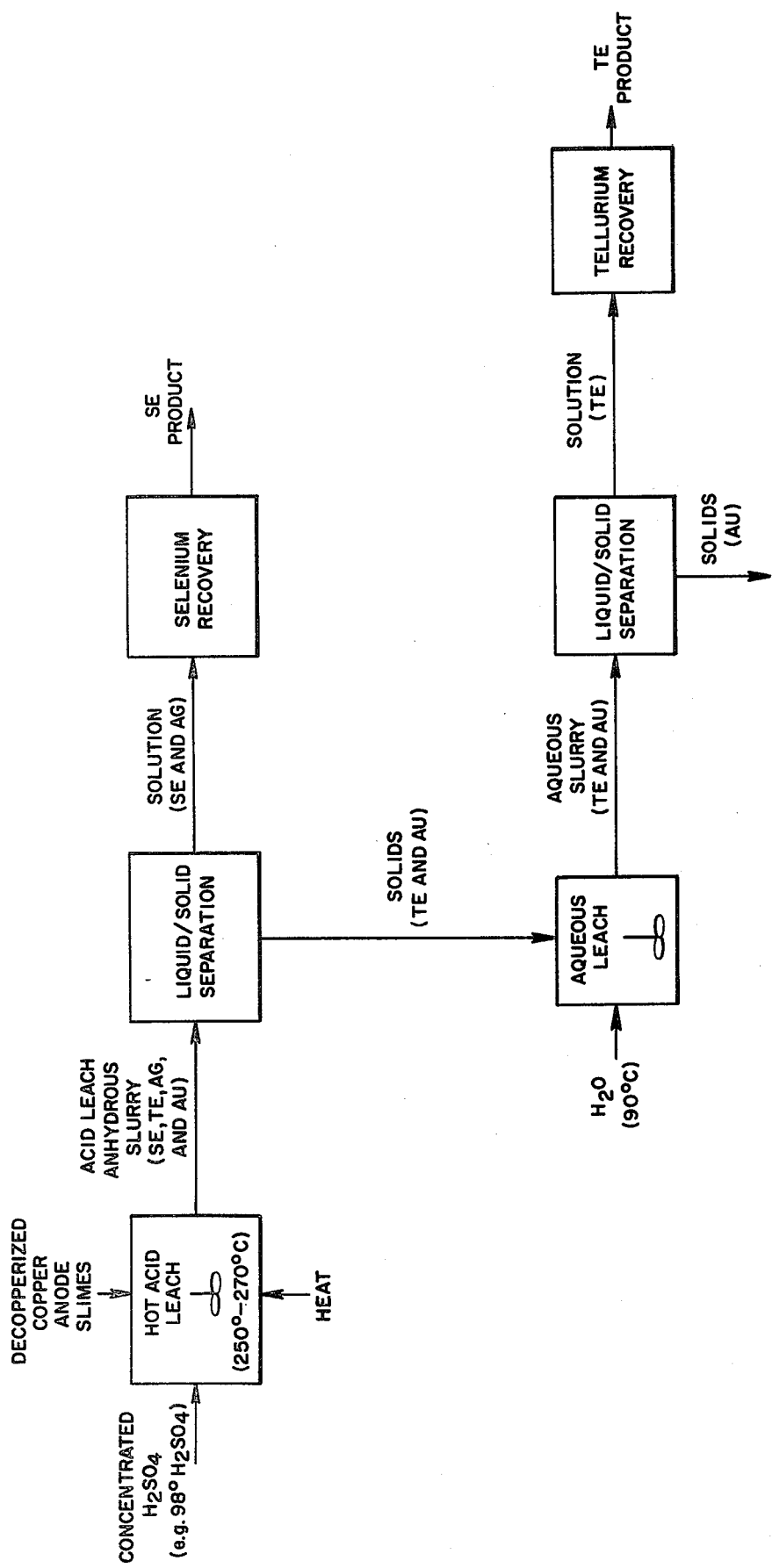

PROCESS FOR SEPARATING SELENIUM AND TELURIUM FROM EACH OTHER

BACKGROUND OF THE INVENTION

1. Field

The invention relates to processes for separating selenium and tellurium values from each other, especially such values as they occur in copper anode slimes.

2. State of the Art

Selenium and tellurium are both Group VI B elements and show considerable chemical similarity. They often occur together as impurities in metal sulfide ores. In the electrolytic refining of copper for instance, a slime residue from the impure copper anodes is deposited at the bottom of the electrolytic cells. These anode slimes ordinarily contain significant amounts of selenium and tellurium as well as other values, such as gold and silver.

In the past, various methods have been employed to separate selenium and tellurium from each other. For instance, U.S. Pat. No. 2,039,256 discloses a process in which a copper anode slime is roasted at an elevated temperature in the presence of sulfuric acid. The selenium is volatilized as selenium and selenium dioxide, while the tellurium remains in the slime. Another method used to separate selenium from tellurium in a copper anode slime is disclosed in U.S. Pat. No. 3,419,355. There, sulfur dioxide gas is passed through a filtrate solution obtained by leaching the anode slime with sulfuric acid. Under controlled conditions of temperature and acidity, selenium is precipitated, while the tellurium is left in the solution.

U.S. Pat. No. 4,002,544 discloses the use of concentrated sulfuric acid or oleum to solubilize silver, selenium, tellurium and barium, while sulfating nickel and copper. It is stated that this procedure can be performed in the range of 160°–300° C. but that temperatures below 200° C. are preferred. This patent does not teach the use of concentrated sulfuric acid to effect a separation of selenium and tellurium from each other. Rather, the teaching is to the contrary, i.e. that both selenium and tellurium are dissolved and coexist in the liquid phase solution.

SUMMARY OF THE INVENTION

In accordance with the present invention, selenium and tellurium are separated one from the other by direct treatment of a feed material containing both of these values. A copper anode slime is the usual feed material. Separation of the two values is accomplished by leaching the feed material with concentrated sulfuric acid at a temperature effective to dissolve both the selenium and the tellurium. The leaching is continued at elevated temperature under anhydrous conditions and for a time sufficient to precipitate the dissolved tellurium, which becomes part of the solids phase along with the residue solids. The liquid and solids phases are then separated, as by filtration, and the solids phase leached with water to dissolve the precipitated tellurium. The elevated temperature employed should be within the range of about 200° C. to 300° C., although as a practical matter the higher end of this range is much more suitable because considerably less time is involved for precipitation of the tellurium. Contrary to the teaching of the aforementioned U.S. Pat. No. 4,002,544, I have found that selenium does not remain in solution at temperatures above 200° C. when anhydrous conditions prevail.

It is contemplated that oleum could be employed instead of the concentrated sulfuric acid, and the temperature employed could be somewhat lower or higher since we have found that part of the tellurium remains insoluble below 200° C. The use of higher temperatures speeds up the process and results in a substantially clean separation which is ordinarily desired.

THE DRAWING

In the accompanying drawing, which exemplifies the best mode presently contemplated for carrying out the invention, the single figure is a flow sheet showing the process as applied to copper anode slimes.

DETAILED DESCRIPTION

The flow sheet appearing in the drawing presents the invention from the standpoint of its application to the separation of selenium and tellurium as normally present in a typical copper anode slime. Other feed materials containing selenium and tellurium can be treated in generally the same manner.

As depicted in the flow sheet, a decopperized copper anode slime is leached with hot concentrated sulfuric acid under conditions of agitation.

Concentrated sulfuric acid is essentially anhydrous, being comprised of as much as 98% $H_2SO_4$ and only 2% $H_2O$. In practicing this invention, concentrated sulfuric acid may be added directly to the feed material, or a dilute solution of sulfuric acid can be added initially. In the latter case, as the temperature is elevated, water vapor is driven off and the dilute solution becomes concentrated. Thus, it is of no consequence that water is initially present; it is only important that the leach step be performed under essentially anhydrous conditions, so that there is insignificant water present at the end of the leach to dissolve more than an insignificant amount of the precipitated tellurium.

It has been discovered that selenium and tellurium can be effectively separated one from the other by leaching a feed material containing same with concentrated sulfuric acid at a temperature sufficiently high to effect dissolution of both the selenium and tellurium and subsequent precipitation of the tellurium.

Tests run at various temperatures between 200° and 300° C. have shown that the desired separation may be effectively accomplished throughout this temperature range, with some taking place somewhat below and somewhat above. However, in separating the selenium and tellurium contained in copper anode slimes, a temperature range of between 250° C. and 270° C. has been found optimum.

After the aforementioned leach is completed, the selenium in the feed slimes will be dissolved in the sulfuric acid, but the tellurium will be in the residue solids. A liquid/solid separation is then effected in conventional manner, e.g. by filtering, and the selenium is recovered from the liquid phase by a conventional method forming no part of this invention.

In order to recover the tellurium, the leach residue is reslurried in water to dissolve the tellurium, after which the liquid phase is separated from the solid phase of this aqueous leach step, again as by filtering. The tellurium values may be recovered from the aqueous solution in known manner, as by reduction with sulfur dioxide.

A typical laboratory example of the application of the invention to a copper anode slime is as follows:

EXAMPLE

A dried, decopperized copper anode slime was leached in concentrated sulfuric acid (96%) at 250° C. for 3 hours (this time was later reduced to one hour without significant change in the results). The leach slurry was filtered and the solids were then reslurried in fresh acid. The resulting slurry was filtered and the residue solids washed on the filter with more of the acid. The washed residue was then leached in deionized water for 30 minutes at 90° C., after which it was filtered and washed on the filter with more water. Assays showed the following results:

|  | % Distribution | | | |
| --- | --- | --- | --- | --- |
|  | Ag | Se | Te | Au |
| Concentrated $H_2SO_4$ filtrate | 99.2 | 99.8 | 2.2 | .009 |
| Water filtrate | .2 | .2 | 97.8 | — |
| Water leach residue | .6 | — | — | 99.99 |

Metallic tellurium was recovered by precipitation from the water leach solution with $SO_2$ at 60° C. for 60 minutes. Hydrochloric acid was added to enhance precipitation. This reduction removed 99.99% of the tellurium from solution. Major impurities in the precipitated tellurium were Se 1.35%, Ag 0.58%, and Cu 0.012%.

Selenium was recovered in metallic form by reducing it with $SO_2$ at 85° C. for 60 minutes, followed by coking for 30 minutes. Major impurities in the selenium product were silver at about 0.1%, tellurium at about 0.01%, and copper at about 0.004%.

Whereas the process is here illustrated and described with respect to a specific procedure presently regarded as the best mode of carrying out the invention, it should be understood that various changes may be made and other procedures adopted without departing from the inventive subject matter pointed out in the following claims.

I claim:

1. A process for separating selenium and tellurium from each other, comprising the steps of leaching a material containing selenium and tellurium values with sulfuric acid to dissolve both the selenium and tellurium values; continuing the leaching under substantially anhydrous conditions with concentrated sulfuric acid at an elevated temperature and for a time period effective to precipitate tellurium values from solution; and separating the liquid and the solids phases of the concentrated sulfuric acid leach slurry.

2. A process according to claim 1, wherein the elevated temperature is within the range of about 200° to about 300° C.

3. A process according to claim 2, wherein the elevated temperature is within the range of about 250° to about 270° C.

4. A process according to either claim 1, 2, or 3, wherein the material subjected to leaching is a decopperized copper anode slime.

5. A process according to claim 1, including the additional steps of leaching the solids phase of the concentrated sulfuric acid leach slurry with water to dissolve the tellurium values; and of separating the liquid and solid phases of the resulting water leach slurry.

6. A process for separating selenium and tellurium values occurring together in solution, comprising heating the solution in the presence of sulfuric acid at an elevated temperature and for a time period sufficient to substantially eliminate any water present and to establish substantially anhydrous conditions in the presence of concentrated sulfuric acid such that tellurium values in solution will precipitate; and separating the liquid and solids phases of the resulting slurry.

7. A process according to claim 6, wherein the elevated temperature is within the range of about 200° to about 300° C.

8. A process according to claim 7, wherein the elevated temperature is within the range of about 250° to about 270° C.

9. A process according to claim 6, including the additional steps of leaching the solids phase of the concentrated sulfuric acid leach slurry with water to dissolve the tellurium values; and of separating the liquid and solid phases of the resulting water leach slurry.

* * * * *